(12) United States Patent
Rosén (10) Patent No.: US 11,041,634 B2
(45) Date of Patent: *Jun. 22, 2021

(54) LOCAL THERMAL ENERGY CONSUMER ASSEMBLY AND A LOCAL THERMAL ENERGY GENERATOR ASSEMBLY FOR A DISTRICT THERMAL ENERGY DISTRIBUTION SYSTEM

(71) Applicant: E.ON Sverige AB, Malmö (SE)

(72) Inventor: Per Rosén, Lund (SE)

(73) Assignee: E.ON SVERIGE AB, Malmö (SE)

( * ) Notice: Subject to any disclaimer, the term of this patent is extended or adjusted under 35 U.S.C. 154(b) by 282 days.

This patent is subject to a terminal disclaimer.

(21) Appl. No.: 15/970,708

(22) PCT Filed: Nov. 2, 2016

(86) PCT No.: PCT/EP2016/076354
§ 371 (c)(1),
(2) Date: May 3, 2018

(87) PCT Pub. No.: WO2017/076866
PCT Pub. Date: May 11, 2017

(65) Prior Publication Data
US 2018/0259197 A1 Sep. 13, 2018

(30) Foreign Application Priority Data
Nov. 4, 2015 (EP) .................................. 15192960

(51) Int. Cl.
*F24D 10/00* (2006.01)
*F24D 19/10* (2006.01)

(52) U.S. Cl.
CPC ....... *F24D 10/003* (2013.01); *F24D 19/1006* (2013.01); *F24D 19/1036* (2013.01);
(Continued)

(58) Field of Classification Search
USPC ......................................................... 237/8 A
See application file for complete search history.

(56) References Cited

U.S. PATENT DOCUMENTS

| | | | | |
|---|---|---|---|---|
| 2005/0081507 A1* | 4/2005 | Tumelty | .................. | F02C 7/224 60/39.08 |
| 2012/0279681 A1* | 11/2012 | Vaughan | ............. | F24D 19/1039 165/62 |
| 2015/0083362 A1* | 3/2015 | Liu | ..................... | F24D 17/0005 165/45 |

FOREIGN PATENT DOCUMENTS

DE         1209716 B      1/1966
DE    102007062402 A1     6/2009
(Continued)

OTHER PUBLICATIONS

International search report & written opinion dated Jan. 24, 2017 in PCT/EP2016/076354 filed Nov. 2, 2016.
(Continued)

*Primary Examiner* — Kenneth J Hansen
*Assistant Examiner* — John E Bargero
(74) *Attorney, Agent, or Firm* — Xsensus LLP (57) ABSTRACT

The present invention relates to a local thermal energy consumer assembly and a local thermal energy generator assembly to be connected to a thermal energy circuit comprising a hot and a cold conduit. The local thermal energy consumer assembly is selectively connected, via a pump or a valve to the hot conduit. The local thermal energy generator assembly is selectively connected, via a pump or a valve to the cold conduit. The use of either the valve or the pump is controlled by determining a local pressure difference between heat transfer liquid of the hot and the cold conduits.

15 Claims, 4 Drawing Sheets

(52) U.S. Cl.
CPC ...... *F24D 19/1069* (2013.01); *F24D 2200/12* (2013.01); *F24D 2220/0207* (2013.01); *F24D 2220/0271* (2013.01); *Y02B 30/17* (2018.05); *Y02E 20/14* (2013.01)

(56) References Cited

FOREIGN PATENT DOCUMENTS

| | | |
|---|---|---|
| EP | 2685174 A1 | 1/2014 |
| EP | 2821726 A1 | 1/2015 |

OTHER PUBLICATIONS

Grant Decision dated Sep. 3, 2020, in corresponding Chinese Application No. 201680064263.6, 4 pages.

\* cited by examiner

LOCAL THERMAL ENERGY CONSUMER ASSEMBLY AND A LOCAL THERMAL ENERGY GENERATOR ASSEMBLY FOR A DISTRICT THERMAL ENERGY DISTRIBUTION SYSTEM

FIELD OF THE INVENTION

The invention relates to a local thermal energy consumer assembly and a local thermal energy generator assembly to be connected to a thermal energy circuit comprising a hot and a cold conduit.

BACKGROUND OF THE INVENTION

Nearly all large developed cities in the world have at least two types of energy grids incorporated in their infrastructures; one grid for providing electrical energy and one grid for providing space heating and hot tap water preparation. Today a common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for improvements in how to provide heating and cooling to a city.

SUMMARY OF THE INVENTION

It is an object of the present invention to solve at least some of the problems mentioned above.

According to a first aspect a local thermal energy consumer assembly is provided. The local thermal energy consumer assembly is arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature. The local thermal energy consumer assembly comprising: a thermal energy consumer valve; a thermal energy consumer pump; a thermal energy consumer heat exchanger connectable to a hot conduit via the thermal energy consumer valve for allowing heat transfer liquid from the hot conduit to flow into the thermal energy consumer heat exchanger, connectable to the hot conduit via the thermal energy consumer pump for pumping heat transfer liquid from the hot conduit into the thermal energy consumer heat exchanger, and connectable to the cold conduit for allowing return of heat transfer liquid from the thermal energy consumer heat exchanger to the cold conduit, wherein the thermal energy consumer heat exchanger is arranged to transfer thermal energy from heat transfer liquid to surroundings of the thermal energy consumer heat exchanger, such that heat transfer liquid returned to the cold conduit has a temperature lower than the first temperature and preferably a temperature equal to the second temperature; a first pressure difference determining device adapted to determine a first local pressure difference between heat transfer liquid of the hot and the cold conduits; and a first controller arranged to, based on the first local pressure difference, selectively control the use of either the thermal energy consumer valve or the thermal energy consumer pump.

According to a second aspect a local thermal energy generator assembly is provided. The local thermal energy generator assembly is arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature. The local thermal energy generator assembly comprising: a thermal energy generator valve; a thermal energy generator pump; a thermal energy generator heat exchanger connectable to the cold conduit via a thermal energy generator valve for allowing heat transfer liquid from the cold conduit to flow into the thermal energy generator heat exchanger, connectable to the cold conduit via the thermal energy generator pump for pumping heat transfer liquid from the cold conduit into the thermal energy generator heat exchanger, and connectable to the hot conduit for allowing return of heat transfer liquid from the thermal energy generator heat exchanger to the hot conduit, wherein the thermal energy generator heat exchanger is arranged to transfer thermal energy from its surroundings to heat transfer liquid, such that the heat transfer liquid returned to hot conduit has a temperature higher than the second temperature and preferably a temperature equal to the first temperature; a second pressure difference determining device adapted to determine a second local pressure difference between heat transfer liquid of the hot and the cold conduits; and a second controller arranged to, based on the second local pressure difference, selectively control the use of either the thermal energy generator valve or the thermal energy generator pump.

The wording "valve" should be construed as a device configured to, in a controlled way, allowing heat transfer liquid to flow through the valve when the valve is in an opened state. Moreover, the valve may also be arranged such that the flow rate of heat transfer liquid through the valve may be controlled. Hence, the valve may be a regulation valve arranged for regulating the flow of heat transfer liquid theretrough.

The wording "pump" should be construed as a device configured to, in a controlled way, allowing heat transfer liquid to be pumped through the pump when the pump is in an active pumping state. Moreover, the pump may also be arranged such that the flow rate of heat transfer liquid through the pump may be controlled.

Hence, the local thermal energy consumer assembly and the local thermal energy generator assembly are arranged to be connected to a thermal energy circuit comprising the hot and the cold conduit. The local thermal energy consumer assembly is selectively connected, via a pump or a valve to the hot conduit. The local thermal energy generator assembly is selectively connected, via a pump or a valve to the cold conduit. The use of either the valve or the pump is controlled by determining a local pressure difference between heat transfer liquid of the hot and the cold conduits.

The wording "selectively connected" should be construed as the heat exchanger concerned is at one point in time in fluid connection either via the pump or via the valve to the respective conduit. Hence, it may be selected if the heat exchanger concerned shall be in fluid connection with the respective conduit via the pump or via the valve.

The local thermal energy consumer assembly and the local thermal energy generator assembly are simple to connect to the thermal energy circuit being part of a district thermal energy distribution system. The design of the thermal energy consumer assembly and the local thermal energy generator assembly allow them to be connected to a thermal energy circuit wherein the pressure between heat transfer liquid of the hot and cold conduits are allowed to vary both spatially and temporally. This since the local thermal energy consumer assembly and the local thermal energy generator assembly comprises the first and second pressure difference determining devices, respectively, and since they are selectively connected to the hot and cold conduit, respectively, via the valve and the pump.

The first controller may be arranged to selectively use the thermal energy consumer valve when the first local pressure difference indicates that the first local pressure of the heat transfer liquid of the hot conduit is larger than the first local pressure of the heat transfer liquid of the cold conduit The first controller may be arranged to selectively use the thermal energy consumer pump when the first local pressure difference indicates that the first local pressure of the heat transfer liquid of the hot conduit is lower than or equal to the first local pressure of the heat transfer liquid of the cold conduit.

The thermal energy consumer heat exchanger may be chosen from the group consisting of a heat pump for comfort heating, a heat pump for tap hot water preparation and a heat pump for snow or ice purging.

The first pressure difference determining device may comprises a hot conduit pressure determining device and a cold conduit pressure determining device, wherein the hot conduit pressure determining device is arranged to be connected to the hot conduit for measuring a first local pressure of the heat transfer liquid of the hot conduit, wherein the cold conduit pressure determining device is arranged to be connected to the cold conduit for measuring a first local pressure of the heat transfer liquid of the cold conduit, and wherein the first local pressure difference device is arranged to determine the first local pressure difference as a pressure difference between the first local pressure of the heat transfer liquid of the hot conduit and the first local pressure of the heat transfer liquid of the cold conduit.

The hot conduit pressure determining device may be connected to the hot conduit in the vicinity to where the thermal energy consumer heat exchanger is connected to the hot conduit.

The cold conduit pressure determining device may be connected to the cold conduit in the vicinity to where the thermal energy consumer heat exchanger is connected to the cold conduit.

The second controller may be arranged to selectively use the thermal energy generator valve when the second local pressure difference indicates that the second local pressure of the heat transfer liquid of the cold conduit is larger than the second local pressure of the heat transfer liquid of the hot conduit.

The second controller may be arranged to selectively use the thermal energy generator pump when the second local pressure difference indicates that the second local pressure of the heat transfer liquid of the cold conduit is lower than or equal to the second local pressure of the heat transfer liquid of the hot conduit.

The thermal energy generator heat exchanger may be chosen from the group consisting of a cooling machine for local comfort cooling, a heat exchanger in a forced exit air ventilation system, a heat exchanger in a waste water system, a freezer and a cooling machine for a computer center.

The second pressure difference determining device may comprises a hot conduit pressure determining device and a cold conduit pressure determining device, wherein the hot conduit pressure determining device is arranged to be connected to the hot conduit for measuring a first local pressure of the heat transfer liquid of the hot conduit, wherein the cold conduit pressure determining device is arranged to be connected to the cold conduit for measuring a first local pressure of the heat transfer liquid of the cold conduit, and wherein the second local pressure difference device is arranged to determine the first local pressure difference as a pressure difference between the first local pressure of the heat transfer liquid of the hot conduit and the first local pressure of the heat transfer liquid of the cold conduit.

The hot conduit pressure determining device may be connected to the hot conduit in the vicinity to where the thermal energy generator heat exchanger is connected to the hot conduit.

The cold conduit pressure determining device is connected to the cold conduit in the vicinity to where the thermal energy generator heat exchanger is connected to the cold conduit.

The temperature difference between the first and second temperatures may be in the range of 5-16° C., preferably in the range of 7-12° C., more preferably 8-10° C.

According to a third aspect a thermal energy assembly is provided. The thermal energy assembly comprises a local thermal energy consumer assembly according to any one the embodiments above and below and a local thermal energy generator assembly according to any one of the embodiments above and below.

The first pressure difference determining device and the second pressure difference determining device may be integrated into a single unit.

The first pressure difference determining device and the second pressure difference determining device may be separate devices.

The first controller and the second controller may be are integrated into a single unit.

The first controller and the second controller may be separate devices.

According to a forth aspect a method for controlling a thermal energy consumer heat exchanger being, via a thermal energy consumer valve and a thermal energy consumer pump, selectively connected to a hot conduit being configured to allow heat transfer liquid of a first temperature to flow therethrough, and being, via a return conduit, connected to a cold conduit being configured to allow heat transfer liquid of a second temperature to flow therethrough, wherein the second temperature is lower than the first temperature is provided. The method comprising: determining a first local pressure difference between heat transfer liquid of the hot conduit and heat transfer liquid of the cold conduit; and based on the first local pressure difference, selectively activating either the thermal energy consumer valve or the thermal energy consumer pump for allowing heat transfer liquid from the hot conduit to enter into the thermal energy consumer heat exchanger.

The thermal energy consumer valve may be set to be selectively activated when the first local pressure difference indicates that the first local pressure of the heat transfer liquid of the hot conduit is larger than the first local pressure of the heat transfer liquid of the cold conduit.

The thermal energy consumer pump may be set to be selectively activated when the first local pressure difference indicates that the first local pressure of the heat transfer liquid of the hot conduit is lower than or equal to the first local pressure of the heat transfer liquid of the cold conduit.

According to a fifth aspect a method for controlling a thermal energy generator heat exchanger being, via a thermal energy generator valve and a thermal energy generator pump, selectively connected to a cold conduit being configured to allow heat transfer liquid of a second temperature to flow therethrough, and, via a return conduit, connected to a hot conduit being configured to allow heat transfer liquid of a first temperature to flow therethrough, wherein the second temperature is lower than the first temperature is provided. The method comprising: determining a second local pressure difference between heat transfer liquid of the hot conduit and heat transfer liquid of the cold conduit; and based on the second local pressure difference, selectively controlling the use of either the thermal energy generator valve or the thermal energy generator pump for allowing heat transfer liquid from the cold conduit to enter into the thermal energy generator heat exchanger.

The thermal energy generator valve may be set to be selectively activated when the second local pressure difference indicates that the second local pressure of the heat transfer liquid of the cold conduit is larger than the second local pressure of the heat transfer liquid of the hot conduit.

The thermal energy generator pump may be set to be selectively activated when the second local pressure difference indicates that the second local pressure of the heat transfer liquid of the cold conduit is lower than or equal to the second local pressure of the heat transfer liquid of the hot conduit.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
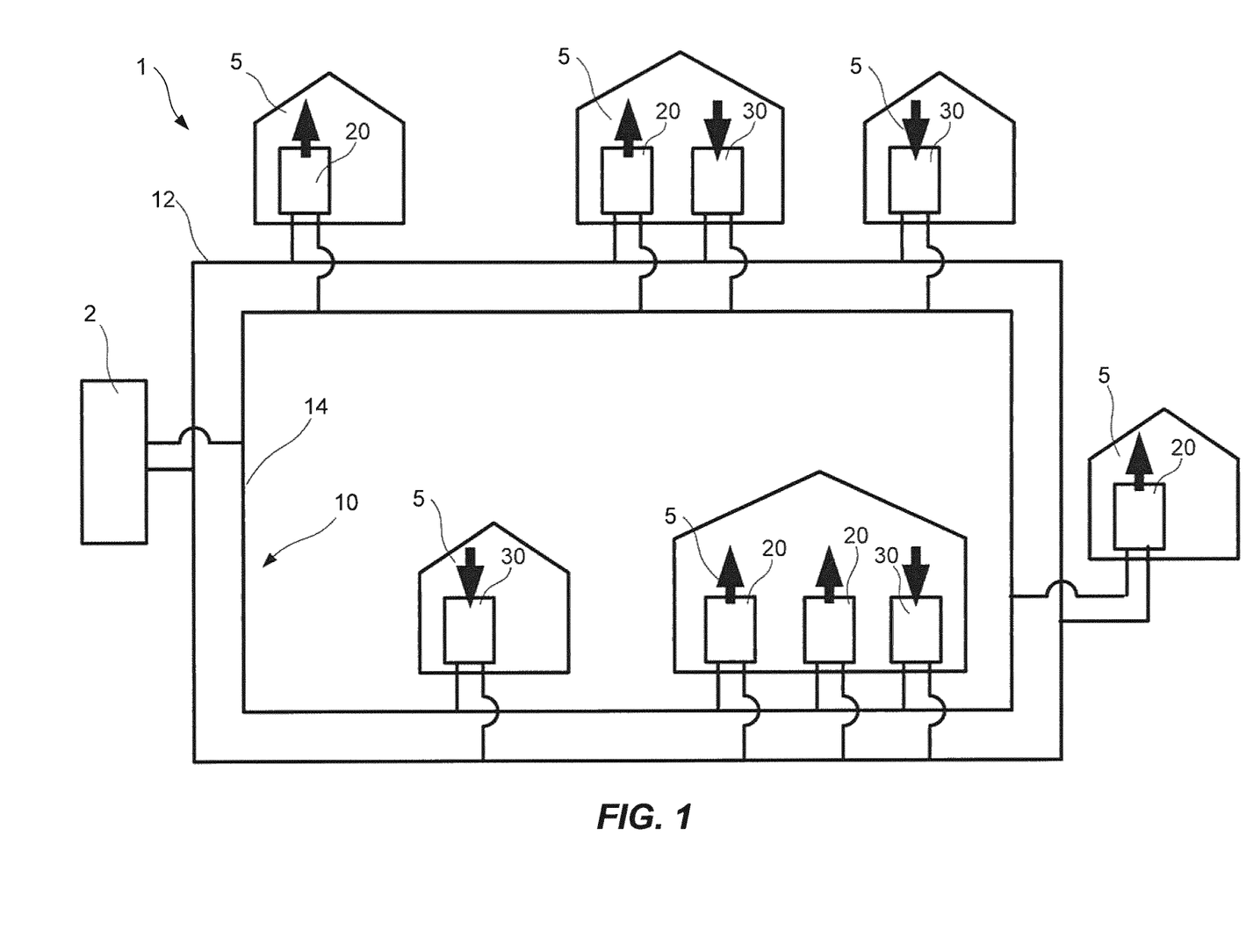
FIG. 1 is a schematic diagram of a district thermal energy distribution system.

In FIG. 1 a district thermal energy distribution system 1 is illustrated. The district thermal energy distribution system 1 comprises a thermal energy circuit 10 and a plurality of buildings 5. The plurality of buildings 5 are thermally coupled to the thermal energy circuit 10. The thermal energy circuit 10 is arranged to circulate and store thermal energy in heat transfer liquid flowing through the thermal energy circuit 10.

According to one embodiment the heat transfer liquid comprises water. However, according to other embodiments other heat transfer liquid may be used. Some non-limiting examples are ammonia, oils, alcohols and anti-freezing liquids such as glycol. The heat transfer liquid may also comprise a mixture of two or more of the heat transfer liquids mentioned above.

The thermal energy circuit 10 comprises two conduits 12, 14 for allowing flow of heat transfer liquid therethrough. The temperature of the heat transfer liquid of the two conduits 12, 14 is set to be different. A hot conduit 12 in the thermal energy circuit 10 is configured to allow heat transfer liquid of a first temperature to flow therethrough. A cold conduit 14 in the thermal energy circuit 10 is configured to allow heat transfer liquid of a second temperature to flow therethrough. The second temperature is lower than the first temperature.

In case heat transfer liquid is water, a suitable temperature range for the hot heat transfer liquid is between 5 and 45° C. and a suitable temperature range for the cold heat transfer liquid is between 0 and 40° C. A suitable temperature difference between the first and second temperatures is in the range of 5-16° C., preferably in the range of 7-12° C., more preferably 8-10° C.

Preferably, the system is set to operate with a sliding temperature difference which varies depending on the climate. Preferably, the sliding temperature difference is fixed. Hence, the temperature difference is always set to momentarily slide with a fixed temperature difference.

The hot conduit 12 and the cool conduit 14 are separate. The hot conduit 12 and the cool conduit 14 may be parallelly arranged. The hot conduit 12 and the cool conduit 14 may be arranged as closed loops of piping. The hot conduit 12 and the cool conduit 14 are fluidly interconnected at the buildings 5 for allowing of thermal energy transfer to and from the buildings 5. This will be discussed more in detail further below.

The two conduits 12, 14 of the thermal energy circuit 10 may be formed by plastic, composite, concrete, or metal pipes. According to one embodiment High Density Polyethylene (HDPE) pipes may be used. The pipes may be single wall pipes. The pipes may be un-insulated. According to one embodiment the thermal energy circuit 10 is mainly arranged in the ground. The ground will be used as thermal inertia of the thermal energy circuit 10. Hence, insulation of the piping gives no extra value. Exceptions are installation in cities with a very warm climate or cities with very cold climate. Here the inertia of the ground may be more harmful than good during critical parts of the year. Here insulation of the piping may be needed.

According to one embodiment the two conduits 12, 14 of the thermal energy circuit 10 are dimensioned for pressures up to 1 MPa (10 bar). According to other embodiments the two conduits 12, 14 of the thermal energy circuit 10 may be dimensioned for pressures up to 0.6 MPa (6 bar) or for pressures up to 1.6 MPa (16 bar).

Each building 5 comprise at least one of one or more local thermal energy consumer assemblies 20 and one or more local thermal energy generator assemblies 30. Hence, each building comprises at least one local thermal energy consumer assembly 20 or at least one local thermal energy generator assembly 30. One specific building 5 may comprise more than one local thermal energy consumer assembly 20. One specific building 5 may comprise more than one local thermal energy generator assembly 30. One specific building 5 may comprise both a local thermal energy consumer assembly 20 and a local thermal energy generator assembly 30.

The local thermal energy consumer assembly 20 is acting as a thermal sink. Hence, the local thermal energy consumer assembly 20 is arranged to remove thermal energy from the thermal energy circuit 10. Or in other words, the local thermal energy consumer assembly 20 is arranged to transfer thermal energy from heat transfer liquid of the thermal energy circuit 10 to surroundings of the local thermal energy consumer assembly 20. This is achieved by transfer thermal energy from heat transfer liquid taken from the hot conduit 12 to surroundings of the local thermal energy consumer assembly 20, such that heat transfer liquid returned to the cold conduit 14 has a temperature lower than the first temperature and preferably a temperature equal to the second temperature.

The local thermal energy generator assembly 30 is acting as a thermal source. Hence, the local thermal energy generator assembly 30 is arranged to deposit thermal energy to the thermal energy circuit 10. Or in other words, the local thermal energy generator assembly 30 is arranged to transfer thermal energy from its surroundings to heat transfer liquid of the thermal energy circuit 10. This is achieved by transfer thermal energy from surroundings of the local thermal energy generator assembly 30 to heat transfer liquid taken from the cold conduit 12, such that heat transfer liquid returned to the hot conduit 12 has a temperature higher than the second temperature and preferably a temperature equal to the first temperature.

The one or more local thermal energy consumer assemblies 20 may be installed in the buildings 5 as local heaters for different heating needs. As a non-limiting example, a local heater may be arranged to deliver space heating or hot tap hot water preparation. Alternatively or in combination, the local heater may deliver pool heating or ice- and snow purging. Hence, the local thermal energy consumer assembly 20 is arranged for deriving heat from heat transfer liquid of the hot conduit 12 and creates a cooled heat transfer liquid flow into the cold conduit 14. Hence, the local thermal energy consumer assembly 20 fluidly interconnects the hot and cool conduits 12, 14 such that hot heat transfer liquid can flow from the hot conduit 12 through the local thermal energy consumer assembly 20 and then into the cool conduit 14 after thermal energy in the heat transfer liquid has been consumed by the local thermal energy consumer assembly 20. The local thermal energy consumer assembly 20 operates to draw thermal energy from the hot conduit 12 to heat the building 5 and then deposits the cooled heat transfer liquid into the cool conduit 14.

The one or more local thermal energy generator assemblies 30 may be installed in different buildings 5 as local coolers for different cooling needs. As an on-limiting example a local cooler may be arranged to deliver space cooling or cooling for freezers and refrigerators. Alternatively or in combination, the local cooler may deliver cooling for ice rinks and ski centers or ice- and snow making. Hence, the local thermal energy generator assembly 30 is deriving cooling from heat transfer liquid of the cold conduit 14 and creates a heated heat transfer liquid flow into the hot conduit 12. Hence, the local thermal energy generator assembly 30 fluidly interconnects the cold and hot conduits 14, 12 such that cold heat transfer liquid can flow from the cold conduit 14 through the local thermal energy generator assembly 30 and then into the hot conduit 12 after thermal energy has been generated into the heat transfer liquid by the local thermal energy generator assembly 30. The local thermal energy generator assembly 30 operates to extract heat from the building 5 to cool the building 5 and deposits that extracted heat into the hot conduit 12.

Figure 2:
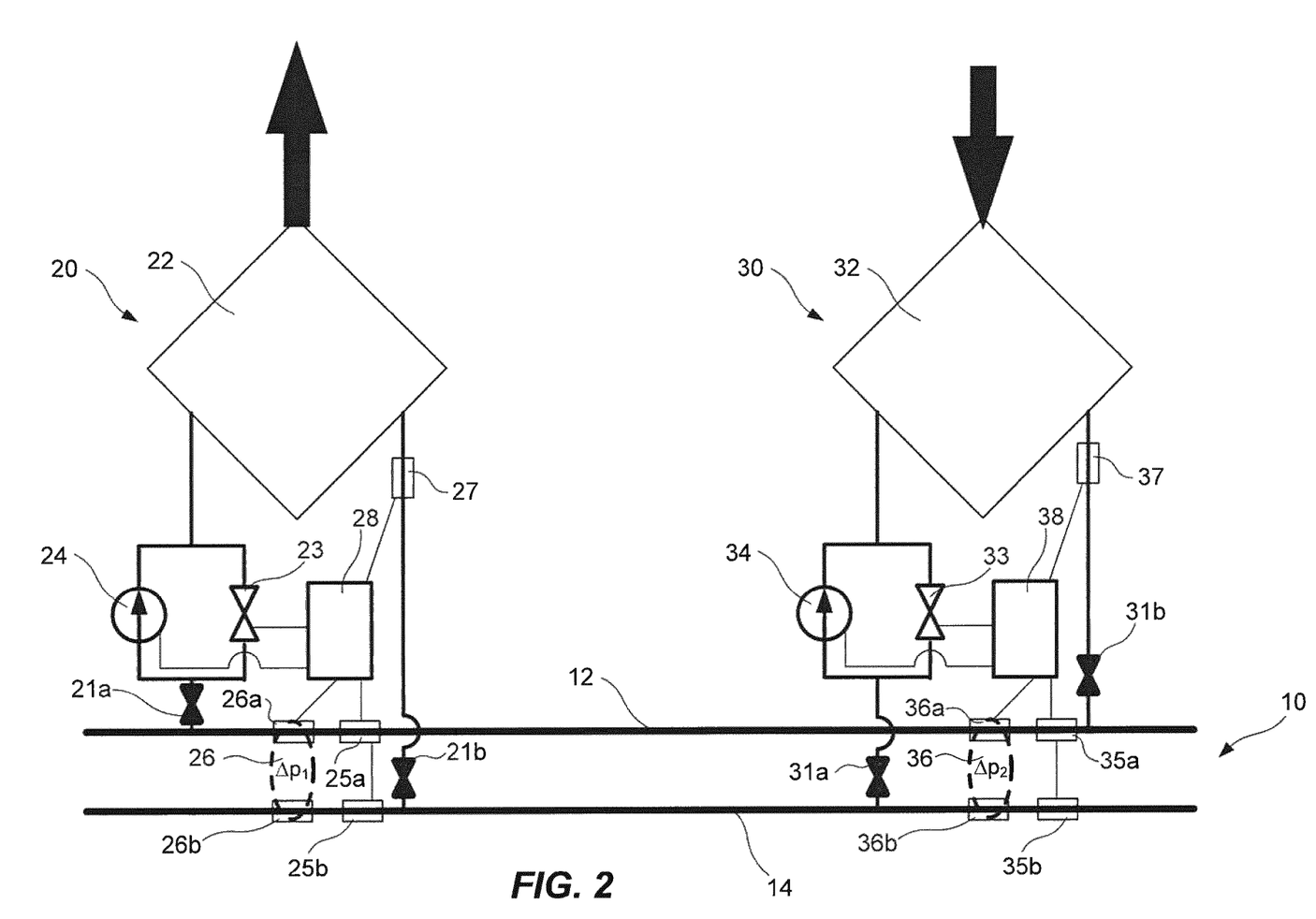
FIG. 2 is a schematic diagram of a local thermal energy consumer assembly and a local thermal energy generator assembly connected to a thermal energy circuit.

With reference to FIG. 2 the function of the local thermal energy consumer assembly 20 and the local thermal energy generator assembly 30 will now be discussed. In FIG. 2 one local thermal energy consumer assembly 20 and one local thermal energy generator assembly 30 are connected to the thermal energy circuit 10. Of course there might be more local thermal energy consumer assemblies or local thermal energy generator assemblies connected to the thermal energy circuit 10.

The local thermal energy consumer assembly 20 comprises a thermal energy consumer heat exchanger 22, a thermal energy consumer valve 23, a thermal energy consumer pump 24, a first pressure difference determining device 26, and a first controller 28.

The thermal energy consumer heat exchanger 22 is selectively connected to the hot conduit 12 via the thermal energy consumer valve 23 and the thermal energy consumer pump 24. Upon selecting the connection of the thermal energy consumer heat exchanger 22 to the hot conduit 12 to be via the thermal energy consumer valve 23, heat transfer liquid from the hot conduit 12 is allowed to flow into the thermal energy consumer heat exchanger 22. Upon selecting the connection of the thermal energy consumer heat exchanger 22 to the hot conduit 12 to be via the thermal energy consumer pump 24, heat transfer liquid from the hot conduit 12 is pumped into the thermal energy consumer heat exchanger 22. As will be discussed more in detail below, the choice of allowing heat transfer liquid from the hot conduit 12 to flow into the thermal energy consumer heat exchanger 22 or pumping heat transfer liquid from the hot conduit 12 into the thermal energy consumer heat exchanger 22, is made based on a local pressure difference between the hot and cold conduits 12, 14.

The thermal energy consumer valve 23 and the thermal energy consumer pump 24 may be arranged as separate devices. The thermal energy consumer valve 23 and the thermal energy consumer pump 24 may be arranged as a single device. The thermal energy consumer valve 23 and the thermal energy consumer pump 24 may be arranged in parallel, as illustrated in FIG. 2. The thermal energy consumer valve 23 and the thermal energy consumer pump 24 may be arranged in series. In this last embodiment wherein the thermal energy consumer valve 23 and the thermal energy consumer pump 24 is arranged in series the pump is arranged to be set in an inactive state allowing a flow of heat transfer liquid there through.

The thermal energy consumer heat exchanger 22 is further connected to the cold conduit 14 for allowing return of heat transfer liquid from the thermal energy consumer heat exchanger 22 to the cold conduit 14.

The first pressure difference determining device 26 is adapted to determine a first local pressure difference, $\Delta p_1$, of the thermal energy circuit 10. The first local pressure difference is preferably measured in the vicinity to where the thermal energy consumer heat exchanger 22 is connected to the thermal energy circuit 10. The first pressure difference determining device 26 may comprises a first hot conduit pressure determining device 26a and a first cold conduit pressure determining device 26b. The first hot conduit pressure determining device is arranged to be connected to the hot conduit 12 for measuring a first local pressure, $p_{1h}$, of the heat transfer liquid of the hot conduit. The first cold conduit pressure determining device is arranged to be connected to the cold conduit 14 for measuring a first local pressure, $p_{1c}$, of the heat transfer liquid of the cold conduit. The first local pressure difference device 26 is arranged to determine the first local pressure difference as a pressure difference between the first local pressure of the heat transfer liquid of the hot conduit and the first local pressure of the heat transfer liquid of the cold conduit. Hence, the first local pressure difference may be defined as a local pressure difference between a first local pressure of the heat transfer liquid of the hot conduit and a first local pressure of the heat transfer liquid of the cold conduit. Preferably, the first local pressure of the heat transfer liquid of the hot conduit is measured in the vicinity to where the thermal energy consumer heat exchanger 22 is connected to the hot conduit 12. Preferably, the first local pressure of the heat transfer liquid of the cold conduit is measured in the vicinity to where the thermal energy consumer heat exchanger 22 is connected to the cold conduit 14.

The first pressure difference determining device 26 may be implemented as a hardware device, a software device, or as a combination thereof. The first pressure difference determining device 26 is arranged to communicate the first local pressure difference, $\Delta p_1$, to the first controller 28.

The first controller 28 may be implemented as a hardware controller, a software controller, or as a combination thereof. The first controller 28 is arranged to selectively control the use of either the thermal energy consumer valve 23 or the thermal energy consumer pump 24. The first controller 28 is arranged to perform the selective control based on the first local pressure difference provided by the first pressure difference determining device 26. The first controller 28 is arranged to communicate with the thermal energy consumer valve 23 and the thermal energy consumer pump 24 for controlling the thermal energy consumer valve 23 and the thermal energy consumer pump 24. The first controller 28 is arranged to selectively control the use of the thermal energy consumer valve 23 when the first local pressure difference indicates that the first local pressure of the heat transfer liquid of the hot conduit is larger than the first local pressure of the heat transfer liquid of the cold conduit. The first controller 28 is arranged to selectively control the use of the thermal energy consumer pump 24 when the first local pressure difference indicates that the first local pressure of the heat transfer liquid of the hot conduit is lower than or equal to the first local pressure of the heat transfer liquid of the cold conduit.

The thermal energy consumer heat exchanger 22 is arranged to transfer thermal energy from heat transfer liquid to surroundings of the thermal energy consumer heat exchanger 22. The heat transfer liquid returned to the cold conduit 14 has a temperature lower than the first temperature. Preferably, thermal energy consumer heat exchanger 22 is controlled such that the temperature of the heat transfer liquid returned to the cold conduit 14 is equal to the second temperature.

The local thermal energy consumer assembly 20 may further comprise a pair of consumer assembly service valves 21a, 21b. The consumer assembly service valves 21a, 21b may be used for connecting and disconnecting the thermal energy consumer heat exchanger 22, the thermal energy consumer valve 23 and the thermal energy consumer pump 24 to/from the thermal energy circuit 10.

The local thermal energy consumer assembly 20 may further comprise a first hot conduit temperature determining device 25a and a first cold conduit temperature determining device 25b. The first hot conduit temperature determining device is arranged to be connected to the hot conduit 12 for measuring a first local temperature, $t_{1h}$, of the heat transfer liquid of the hot conduit. The first cold conduit temperature determining device is arranged to be connected to the cold conduit 14 for measuring a first local temperature, $t_{1c}$, of the heat transfer liquid of the cold conduit. The first hot conduit temperature determining device 25a and the first cold conduit temperature determining device 25b are connected to the first controller 28 for communicating the measured local temperatures of the heat transfer liquid thereto.

The local thermal energy consumer assembly 20 may further comprise a first outlet temperature determining device 27. The first outlet temperature determining device 27 is arranged to be connected to the return conduit connecting the outlet of the thermal energy consumer heat exchanger 22 to the cold conduit 14. The first outlet temperature determining device 27 is arranged to measure a first outlet temperature, tch, of heat transfer liquid exiting the outlet of the thermal energy consumer heat exchanger 22 and being returned to the cold conduit 14. The first outlet temperature determining device 27 is connected to the first controller 28 for communicating the measured first outlet temperature of heat transfer liquid exiting the thermal energy consumer heat exchanger 22 thereto.

Figure 3:
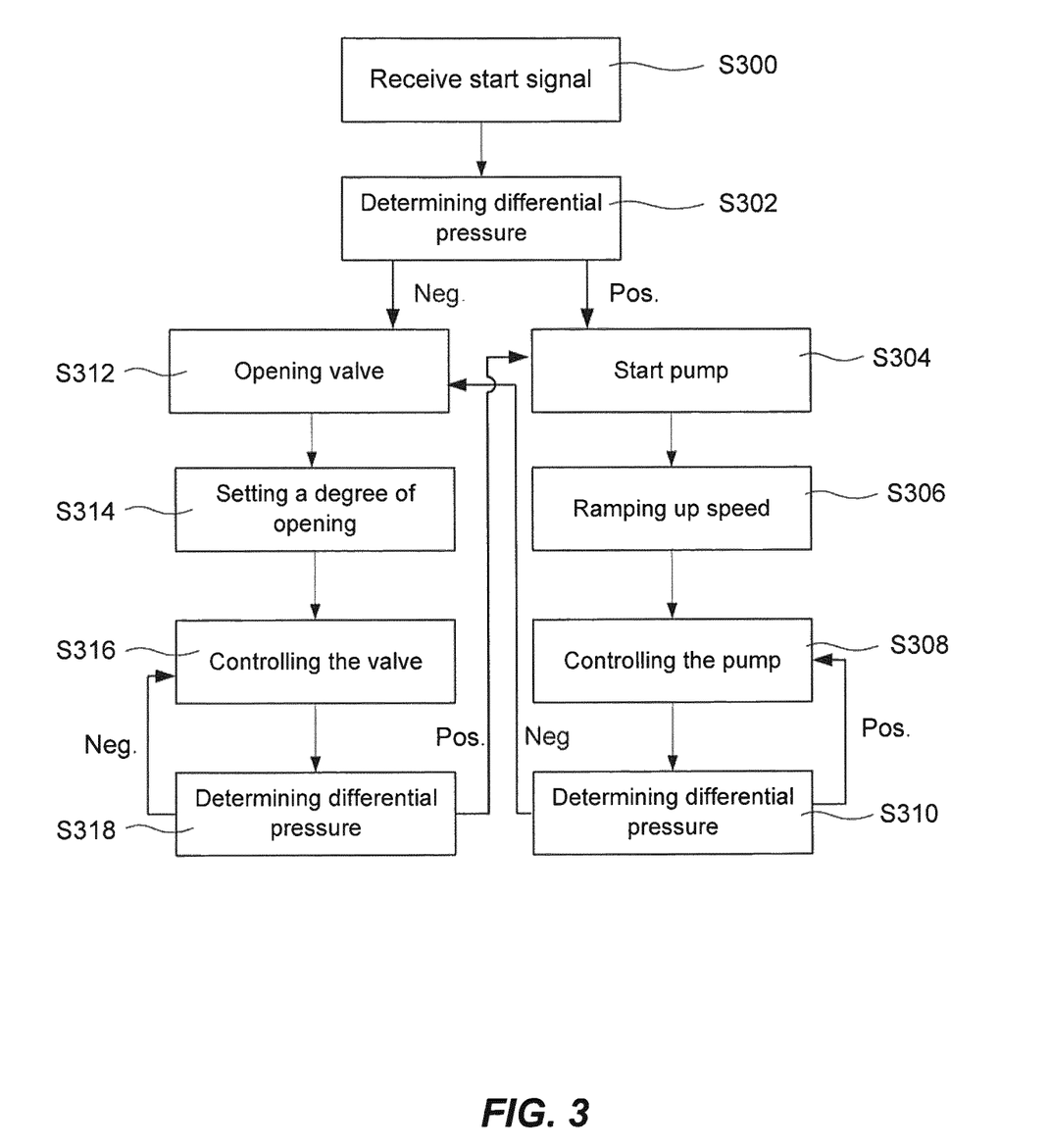
FIG. 3 is a block diagram of controlling of a local thermal energy consumer assembly.

In connection with FIG. 3, below an exemplified embodiment on how the first controller 28 is arranged to control the local thermal energy consumer assembly 20 will discussed. Starting of the Local Thermal Enemy Consumer Assembly
1. Receiving a start signal S300 by the first controller 28. The start signal indicating that the local thermal energy consumer assembly 20 shall start working for exhaling thermal energy to its surroundings. The start signal may e.g. be issued by a thermostat (not shown) located in the building wherein the local thermal energy consumer assembly 20 is situated.

2. Determining S302 a first local delivery differential pressure, $\Delta p_1$ d, according to the following:

$$\Delta p_{1dp} = p_{1c} - p_{1h} + \Delta p_{che}$$

wherein $\Delta p_{che}$ is a fixed differential pressure for overcoming the pressure drop over the thermal energy consumer heat exchanger 22.

3. In case the first local delivery differential pressure, $\Delta p_{1dp}$, is a positive value:
   a. Sending a start signal S304 to the thermal energy consumer pump 24.
   b. Ramping up S306 the speed of the thermal energy consumer pump 24 so that a predetermined flow rate through the thermal energy consumer heat exchanger 22 is achieved.
   c. Switching to normal operation mode of the local thermal energy consumer assembly at pump operation, see below.

4. In case the first local delivery differential pressure, $\Delta p_{1dp}$, is a negative value:
   a. Sending S312 an opening signal to the thermal energy consumer valve 23.
   b. Setting S314 a degree of opening of the thermal energy consumer valve 23 so that a predetermined flow rate through the thermal energy consumer heat exchanger 22 is achieved.
   c. Switching to normal operation mode of the local thermal energy consumer assembly at valve operation, see below.

Normal Operation Mode of the Local Thermal Enemy Consumer Assembly at Pump Operation 1. Controlling S308 the thermal energy consumer pump 24 such that the flow rate of heat transfer liquid through the thermal energy consumer heat exchanger 22 is set such that a differential temperature, $\Delta t_{che} = t_{1h} - t_{che}$, over the thermal energy consumer heat exchanger 22 is kept at a predetermined value. A suitable predetermined differential temperature is in the range of 5-16° C., preferably in the range of 7-12° C., more preferably 8-10° C.

2. Determining S310 the first local delivery differential pressure, $\Delta p_1$.

3. In case the first local delivery differential pressure, $\Delta p_{1dp}$, is a positive value; return to point 1. above under "Normal operation mode of the local thermal energy consumer assembly at pump operation".

4. In case the first local delivery differential pressure, $\Delta p_{1dp}$, is a negative value:
   a. Go to point 4, above under "Starting of the local thermal energy consumer assembly".
   b. Stopping the thermal energy consumer pump 24 by sending a stop signal thereto from the first controller.

Normal Operation Mode of the Local Thermal Enemy Consumer Assembly at Valve Operation 1. Controlling S316 the thermal energy consumer valve 23 such that the flow rate of heat transfer liquid through the thermal energy consumer heat exchanger 22 is set such that the differential temperature, $\Delta t_{che} = t_{1h} - t_{che}$, over the thermal energy consumer heat exchanger 22 is kept at a predetermined value. A suitable predetermined differential temperature is in the range of 5-16° C., preferably in the range of 7-12° C., more preferably 8-10° C.

2. Determining S318 the first local delivery differential pressure, $\Delta p_{1dp}$.

3. In case the first local delivery differential pressure, $\Delta_{1dp}$, is still a negative value; return to point 1. above under "Normal operation mode of the local thermal energy consumer assembly at valve operation".

4. In case the first local delivery differential pressure, $\Delta p_{1dp}$, is a negative value:
   a. Go to point 3, above under "Starting of the local thermal energy consumer assembly".
   b. Closing the thermal energy consumer valve 24 by sending a closing signal thereto from the first controller.

The local thermal energy generator assembly 30 comprises a thermal energy generator heat exchanger 32, a thermal energy generator valve 33, a thermal energy generator pump 34, a second pressure difference determining device 36, and a second controller 28.

The thermal energy generator heat exchanger 32 is selectively connected to the cold conduit 14 via the thermal energy generator valve 33 and the thermal energy generator pump 34. Upon selecting the connection of the thermal energy generator heat exchanger 32 to the cold conduit 14 to be via the thermal energy generator valve 33, heat transfer liquid from the cold conduit 14 is allowed to flow into the thermal energy generator heat exchanger 32. Upon selecting the connection of the thermal energy generator heat exchanger 32 to the cold conduit 14 to be via the thermal energy generator pump 34, heat transfer liquid from the cold conduit 14 is pumped into the thermal energy generator heat exchanger 32. As will be discussed more in detail below, the choice of allowing heat transfer liquid from the cold conduit 14 to flow into the thermal energy generator heat exchanger 32 or pumping heat transfer liquid from the cold conduit 14 into the thermal energy generator heat exchanger 32, is made based on a local pressure difference between the hot and cold conduits 12, 14.

The thermal energy generator valve 33 and the thermal energy generator pump 34 may be arranged as separate devices. The thermal energy generator valve 33 and the thermal energy generator pump 34 may be arranged as a single device. The thermal energy generator valve 33 and the thermal energy generator pump 34 may be arranged in parallel, as illustrated in FIG. 2. The thermal energy generator valve 33 and the thermal energy generator pump 34 may be arranged in series. In this last embodiment wherein the thermal energy generator valve 33 and the thermal energy generator pump 34 is arranged in series the pump is arranged to be set in an inactive state allowing a flow of heat transfer liquid there through.

The thermal energy generator heat exchanger 32 is further connected to the hot conduit 12 for allowing return of heat transfer liquid from the thermal energy generator heat exchanger 32 to the hot conduit 12.

The second pressure difference determining device 36 is adapted to determine a second local pressure difference, $\Delta p_2$, of the thermal energy circuit 10. The second local pressure difference is preferably measured in the vicinity to where the thermal energy generator heat exchanger 32 is connected to the thermal energy circuit 10. The second pressure difference determining device 36 may comprises a second hot conduit pressure determining device 36a and a second cold conduit pressure determining device 36b. The second hot conduit pressure determining device is arranged to be connected to the hot conduit 12 for measuring a second local pressure, $p_{2h}$, of the heat transfer liquid of the hot conduit. The second cold conduit pressure determining device is arranged to be connected to the cold conduit 14 for measuring a second local pressure, $p_{2c}$, of the heat transfer liquid of the cold conduit. The second local pressure difference device 36 is arranged to determine the second local pressure difference as a pressure difference between the second local pressure of the heat transfer liquid of the hot conduit and the second local pressure of the heat transfer liquid of the cold conduit. Hence, the second local pressure difference may be defined as a local pressure difference between a second local pressure of the heat transfer liquid of the hot conduit and a second local pressure of the heat transfer liquid of the cold conduit. Preferably, the second local pressure of the heat transfer liquid of the hot conduit is measured in the vicinity to where the thermal energy generator heat exchanger 32 is connected to the hot conduit 12. Preferably, the second local pressure of the heat transfer liquid of the cold conduit is measured in the vicinity to where the thermal energy generator heat exchanger 32 is connected to the cold conduit 14.

The second pressure difference determining device 36 may be implemented as a hardware device, a software device, or as a combination thereof. The second pressure difference determining device 36 is arranged to communicate the second local pressure difference, $\Delta p_2$, to the second controller 38.

The second controller 38 may be implemented as a hardware controller, a software controller, or as a combination thereof. The second controller 38 is arranged to selectively control the use of either the thermal energy generator valve 33 or the thermal energy generator pump 34. The second controller 38 is arranged to perform the selective control based on the second local pressure difference provided by the second pressure difference determining device 36. The second controller 38 is arranged to communicate with the thermal energy generator valve 33 and the thermal energy generator pump 34 for controlling the thermal energy generator valve 33 and the thermal energy generator pump 34. The second controller 38 is arranged to selectively control the use of the thermal energy generator valve 33 when the second local pressure difference indicates that the second local pressure of the heat transfer liquid of the cold conduit is larger than the second local pressure of the heat transfer liquid of the hot conduit. The second controller 38 is arranged to selectively control the use of the thermal energy generator pump 34 when the second local pressure difference indicates that the second local pressure of the heat transfer liquid of the cold conduit is lower than or equal to the second local pressure of the heat transfer liquid of the hot conduit.

The thermal energy generator heat exchanger 32 is arranged to transfer thermal energy from its surroundings to heat transfer liquid. The heat transfer liquid returned to hot conduit 12 has a temperature higher than the second temperature. Preferably, thermal energy generator heat exchanger 32 controlled such that the temperature of the heat transfer liquid returned to the hot conduit 12 is equal to the first temperature.

The local thermal energy generator assembly 30 may further comprise a pair of generator assembly service valves 31a, 31b. The generator assembly service valves 31a, 31b may be used for connecting and disconnecting the thermal energy generator heat exchanger 32, the thermal energy generator valve 33 and the thermal energy generator pump 34 to/from the thermal energy circuit 10.

The local thermal energy generator assembly 30 may further comprise a second hot conduit temperature determining device 35a and a second cold conduit temperature determining device 35b. The second hot conduit temperature determining device is arranged to be connected to the hot conduit 12 for measuring a second local temperature, $t_{2h}$, of the heat transfer liquid of the hot conduit. The second cold conduit temperature determining device is arranged to be connected to the cold conduit 14 for measuring a second local temperature, $t_{2c}$, of the heat transfer liquid of the cold conduit. The second hot conduit temperature determining device 35a and the second cold conduit temperature determining device 35b are connected to the second controller 28 for communicating the measured local temperatures of the heat transfer liquid thereto.

The local thermal energy generator assembly 30 may further comprise a second outlet temperature determining device 37. The second outlet temperature determining device 37 is arranged to be connected to the return conduit connecting the outlet of the thermal energy generator heat exchanger 32 to the hot conduit 12. The second outlet temperature determining device 37 is arranged to measure a second outlet temperature $t_{ghe}$, of heat transfer liquid exiting the outlet of the thermal energy generator heat exchanger 32 and being returned to the hot conduit 12. The second outlet temperature determining device 37 is connected to the second controller 38 for communicating the measured second outlet temperature of heat transfer liquid exiting the thermal energy generator heat exchanger 32 thereto.

Figure 4:
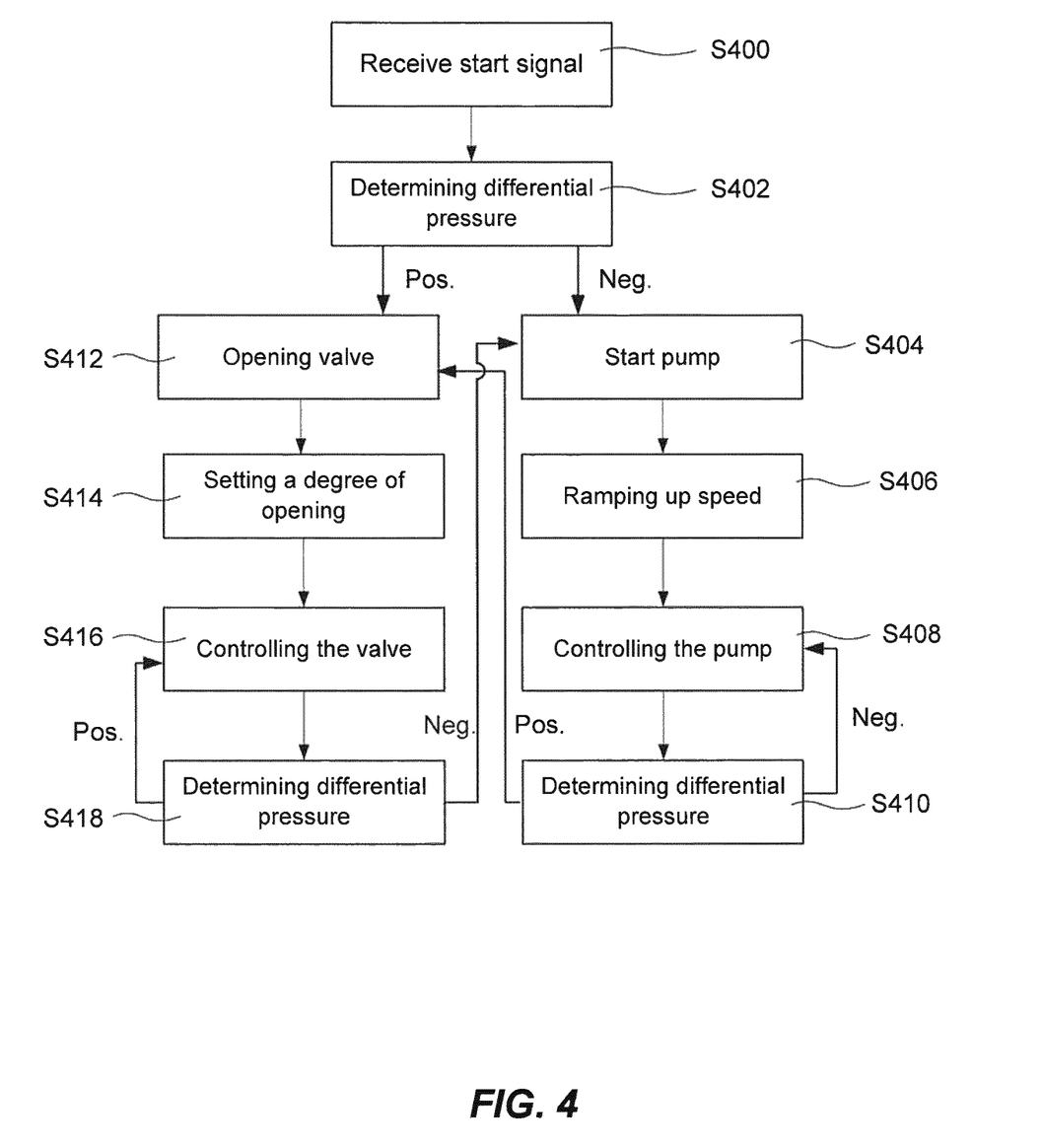
FIG. 4 is a block diagram of controlling of a local thermal energy generator assembly

In connection with FIG. 4, below an exemplified embodiment on how the second controller 38 is arranged to control the local thermal energy generator assembly 30 will discussed.

Starting of the Local Thermal Enemy Generator Assembly
  1. Receiving S400 a start signal by the second controller 38. The start signal indicating that the local thermal energy generator assembly 20 shall start working for inhaling thermal energy from its surroundings. The start signal may e.g. be issued by a thermostat (not shown) located in the building wherein the local thermal energy generator assembly 30 is situated.
  2. Determining S402 a second local delivery differential pressure, $\Delta p_{2dp}$, according to the following:

$$\Delta_{2dp} = p_{2c} - p_{2h} + \Delta p_{ghe}$$

wherein $\Delta p_{ghe}$ is a fixed differential pressure for overcoming the pressure drop over the thermal energy generator heat exchanger 32.
  3. In case the second local delivery differential pressure, $\Delta p_{2dp}$, is a negative value:
    a. Sending S404 a start signal to the thermal energy generator pump 34.
    b. Ramping up S406 the speed of the thermal energy generator pump 34 so that a predetermined flow rate through the thermal energy generator heat exchanger 32 is achieved.
    c. Switching to normal operation mode of the local thermal energy generator assembly at pump operation, see below.
  4. In case the second local delivery differential pressure, $\Delta p_{2dp}$, is a positive value:
    a. Sending an opening signal S412 to the thermal energy generator valve 33.
    b. Setting a degree of opening S414 of the thermal energy generator valve 33 so that a predetermined flow rate through the thermal energy generator heat exchanger 32 is achieved.
    c. Switching to normal operation mode of the local thermal energy generator assembly at valve operation, see below.

Normal Operation Mode of the Local Thermal Enemy Generator Assembly at Pump Operation
  1. Controlling S408 the thermal energy generator pump 34 such that the flow rate of heat transfer liquid through the thermal energy generator heat exchanger 32 is set such that a differential temperature, $\Delta t_{ghe}=t_{2h}-t_{ghe}$, over the thermal energy consumer heat exchanger 22 is kept at a predetermined value. A suitable predetermined differential temperature is in the range of 5-16° C., preferably in the range of 7-12° C., more preferably 8-10° C.
2. Determining S412 the second local delivery differential pressure, $\Delta p_{2dp}$.
3. In case the second local delivery differential pressure, $\Delta p_{2dp}$, is a negative value; return to point 1. above under "Normal operation mode of the local thermal energy generator assembly at pump operation".
4. In case the second local delivery differential pressure, $\Delta p_{2dp}$, is a positive value:
   a. Go to point 4, above under "Starting of the local thermal energy generator assembly".
   b. Stopping the thermal energy generator pump 34 by sending a stop signal thereto from the second controller.

Normal Operation Mode of the Local Thermal Enemy Generator Assembly at Valve Operation
1. Controlling S416 the thermal energy generator valve 33 such that the flow rate of heat transfer liquid through the thermal energy generator heat exchanger 32 is set such that the differential temperature, $\Delta t_{ghe}=t_{2h}-t_{ghe}$, over the thermal energy generator heat exchanger 32 is kept at a predetermined value. A suitable predetermined differential temperature is in the range of 5-16° C., preferably in the range of 7-12° C., more preferably 8-10° C.
2. Determining S418 the second local delivery differential pressure, $\Delta p_{2dp}$.
3. In case the second local delivery differential pressure, $\Delta p_{2dp}$, is still a positive value; return to point 1. above under "Normal operation mode of the local thermal energy generator assembly at valve operation".
4. In case the second local delivery differential pressure, $\Delta p_{2dp}$, is a positive value:
   a. Go to point 3, above under "Starting of the local thermal energy generator assembly".
   b. Closing the thermal energy generator valve 34 by sending a closing signal thereto from the second controller.

Accordingly, the district thermal energy distribution system 1 comprises a thermal energy circuit 10 comprising a hot and a cold conduit 12, 14 for allowing flow of heat transfer liquid therethrough. The district thermal energy distribution system 1 further comprises a thermal energy consumer heat exchanger 22 and a thermal energy generator heat exchanger 32. The thermal energy consumer heat exchanger 22 is selectively connected to the hot conduit 12 via the thermal energy consumer valve 23 or the thermal energy consumer pump 24. The thermal energy generator heat exchanger 32 is selectively connected to the cold conduit 14 via the thermal energy generator valve 23 or the thermal energy generator pump 24.

In the in FIG. 2 shown embodiment the first and second pressure difference determining devices 26; 36 are two physically different pressure difference determining devices. However, according to another embodiment one specific local thermal energy consumer assembly 20 and one specific local thermal energy generator assembly 30 may share the same pressure difference determining device. Hence, the first and second pressure difference determining devices 26; 36 may physically be the same pressure difference determining device. According to a further embodiment two specific local thermal energy consumer assemblies 20 may share the same pressure difference determining device. According to a yet another embodiment two specific local thermal energy generator assemblies 30 may share the same pressure difference determining device.

In the in FIG. 2 shown embodiment the first and second controllers 28; 38 are two physically different controller. However, according to another embodiment one specific local thermal energy consumer assembly 20 and one specific local thermal energy generator assembly 30 may share the same controller. Hence, the first and second controller 26; 36 may physically be the same controller. According to a further embodiment two specific local thermal energy consumer assemblies 20 may share the same controller. According to a yet another embodiment two specific local thermal energy generator assemblies 30 may share the same controller.

Preferably, the demand to inhale or exhale heat using the thermal energy consumer heat exchangers 22 and the thermal energy generator heat exchangers 32 is made at a defined temperature difference. A temperature difference of 8-10° C. corresponds to optimal flows through the thermal energy consumer heat exchangers 22 and the thermal energy generator heat exchangers 32.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific local thermal energy consumer/generator assembly 20, 30 may need to pump heat transfer liquid through the corresponding thermal energy consumer/generator heat exchanger 22, 32 and sometimes the specific local thermal energy consumer/generator assembly 20, 20 may need to let heat transfer liquid flow through the corresponding thermal energy consumer/generator heat exchanger 22, 32. Accordingly, it will be possible to let all the pumping within the system 1 to take place in the local thermal energy consumer/generator assemblies 20, 30. Due to the limited flows and pressures needed small frequency controlled circulation pumps may be used.

The district thermal energy distribution system 1 allow for the local pressure difference between heat transfer liquid of the hot and cold conduits 12, 14 to vary along the thermal energy circuit 10. Especially, the local pressure difference between heat transfer liquid of the hot and cold conduits 12, 14 may vary from positive to negative pressure difference seen from one of the hot and cold conduits 12, 14. The district thermal energy distribution system 1 further allow for the possibility to let all the pumping within the system to take place in the local thermal energy consumer/generator assemblies 20, 30. Due to the limited flows and pressures needed small frequency controlled circulation pumps may be used. Hence, an easy to build district thermal energy distribution system 1 is provided. Further a district thermal energy distribution system 1 that is easy to control is provided.

The basic idea of the district thermal energy distribution system 1 is based on the insight by the inventors that modern day cities by them self provide thermal energy that may be reused within the city. The reused thermal energy may be picked up by the district thermal energy distribution system 1 and be used for e.g. space heating or hot tap water preparation. Moreover, increasing demand for space cooling will also be handled within the district thermal energy distribution system 1. Within the district thermal energy distribution system 1 buildings 5 within the city are interconnected and may in an easy and simple way redistribute low temperature waste energy for different local demands. Amongst other the district thermal energy distribution system will provide for:

Minimizing the use of primary energy due to optimal re-use of energy flows inside the city.

Limiting the need for chimneys or firing places inside the city, since the need for locally burning gas or other fuels will be reduced.

Limiting the need for cooling towers or cooling convectors inside the city, since excess heat produced by cooling devices may be transported away and reused within the district thermal energy distribution system 1.

Hence, the district thermal energy distribution system 1 provide for a smart duel use of thermal energy within a city. When integrated into a city the district thermal energy distribution system 1 provide make use of low level thermal energy waste in both heating and cooling applications within the city. This will reduce the primary energy consumption of a city by eliminating the need for a gas grid or a district heating grid and a cooling grid in city.

The district thermal energy distribution system 1 may comprise a thermal server plant 2. The thermal server plant 2 functions as an external thermal source and/or thermal sink. The function of the thermal server plant 2 is to maintain the temperature difference between the hot and cold conduits 12, 14 of the thermal energy circuit 10. That is, the thermal server plant 2 may be used for balancing the district thermal energy distribution system 1 such that when the thermal energy circuit 10 reaches a temperature end point the thermal server plant 2 is arranged to inhale or exhale thermal energy to/from the thermal energy circuit 10. In winter time, when there is higher probability that the hot conduit 12 reaches its' lowest temperature end point, the thermal server plant 2 is used for adding thermal energy to the thermal energy circuit 10. In summer time, when there is higher probability that the cold conduit reaches its' highest temperature end point, the thermal server plant 2 is used to subtract thermal energy from the thermal energy circuit 10.

The person skilled in the art realizes that the present invention by no means is limited to the preferred embodiments described above. On the contrary, many modifications and variations are possible within the scope of the appended claims.

For example, the thermal energy consumer pump 24 and/or the thermal energy generator pump 24 may for example be a frequency controlled circulation pump.

The thermal energy consumer valve 23 and/or the thermal energy generator valve 33 may be a regulation valve.

Additionally, variations to the disclosed embodiments can be understood and effected by the skilled person in practicing the claimed invention, from a study of the drawings, the disclosure, and the appended claims.

The invention claimed is:

1. A local thermal energy consumer assembly arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature, the local thermal energy consumer assembly comprising:

a thermal energy consumer valve;
a thermal energy consumer pump;
a thermal energy consumer heat exchanger connectable to the hot conduit via the thermal energy consumer valve for allowing heat transfer liquid from the hot conduit to flow into the thermal energy consumer heat exchanger, connectable to the hot conduit via the thermal energy consumer pump for pumping heat transfer liquid from the hot conduit into the thermal energy consumer heat exchanger, and connectable to the cold conduit for allowing return of heat transfer liquid from the thermal energy consumer heat exchanger to the cold conduit, wherein the thermal energy consumer heat exchanger is arranged to transfer thermal energy from heat transfer liquid to surroundings of the thermal energy consumer heat exchanger, such that heat transfer liquid returned to the cold conduit has a temperature lower than the first temperature;

a first pressure difference determining device adapted to determine a first local pressure difference, $\Delta p1$, between heat transfer liquid of the hot and the cold conduits; and a first controller arranged to, based on the first local pressure difference, selectively control the use of either the thermal energy consumer valve or the thermal energy consumer pump, wherein the thermal energy consumer valve is set to be selectively activated when the first local pressure difference indicates that a first local pressure of the heat transfer liquid of the hot conduit is larger than a first local pressure of the heat transfer liquid of the cold conduit, and wherein the thermal energy consumer pump is set to be selectively activated when the first local pressure difference indicates that the first local pressure of the heat transfer liquid of the hot conduit is lower than or equal to the first local pressure of the heat transfer liquid of the cold conduit.

2. The local lermal energy consumer assembly according to claim 1, wherein the first pressure difference determining device comprises a hot conduit pressure determining device and a cold conduit pressure determining device, wherein the hot conduit pressure determining device is arranged to be connected to the hot conduit for measuring a first local pressure of the heat transfer liquid of the hot conduit, wherein the cold conduit pressure determining device is arranged to be connected to the cold conduit for measuring a first local pressure of the heat transfer liquid of the cold conduit, and wherein the first local pressure difference device is arranged to determine the first local pressure difference as a pressure difference between the first local pressure of the heat transfer liquid of the hot conduit and the first local pressure of the heat transfer liquid of the cold conduit.

3. The local thermal energy consumer assembly according to claim 2, wherein the hot conduit pressure determining device is connected to the hot conduit adjacent to where the thermal energy consumer heat exchanger is connected to the hot conduit, and wherein the cold conduit pressure determining device is connected to the cold conduit adjacent to where the thermal energy consumer heat exchanger is connected to the cold conduit.

4. The local thermal energy consumer assembly according to claim 1, wherein the temperature difference between the first and second temperatures is in the range of 5-16° C.

5. A local thermal energy generator assembly arranged to be connected to a thermal energy circuit comprising a hot conduit configured to allow heat transfer liquid of a first temperature to flow therethrough, and a cold conduit configured to allow heat transfer liquid of a second temperature to flow therethrough, the second temperature is lower than the first temperature, the local thermal energy generator assembly comprising:

a thermal energy generator valve;
a thermal energy generator pump;
a thermal energy generator heat exchanger connectable to the cold conduit via the thermal energy generator valve for allowing heat transfer liquid from the cold conduit to flow into the thermal energy generator heat exchanger, connectable to the cold conduit via the thermal energy generator pump for pumping heat transfer liquid from the cold conduit into the thermal energy generator heat exchanger, and connectable to the hot conduit for allowing return of heat transfer liquid from the thermal energy generator heat exchanger to the hot conduit, wherein the thermal energy generator heat exchanger is arranged to transfer thermal energy from its surroundings to heat transfer liquid, such that the heat transfer liquid returned to the hot conduit has a temperature higher than the second temperature;
a second pressure difference determining device adapted to determine a second local pressure difference, $\Delta p2$, between heat transfer liquid of the hot and the cold conduits; and
a second controller arranged to, based on the second local pressure difference, selectively control the use of either the thermal energy generator valve or the thermal energy generator pump,
wherein the thermal energy generator valve is set to be selectively activated when the second local pressure difference indicates that a second local pressure of the heat transfer liquid of the cold conduit is larger than a second local pressure of the heat transfer liquid of the hot conduit, and wherein the thermal energy generator pump is set to be selectively activated when the second local pressure difference indicates that the second local pressure of the heat transfer liquid of the cold conduit is lower than or equal to the second local pressure of the heat transfer liquid of the hot conduit.

6. The local thermal energy generator assembly according to claim 5, wherein the second pressure difference determining device comprises a hot conduit pressure determining device and a cold conduit pressure determining device, wherein the hot conduit pressure determining device is arranged to be connected to the hot conduit for measuring a first local pressure of the heat transfer liquid of the hot conduit, wherein the cold conduit pressure determining device is arranged to be connected to the cold conduit for measuring a first local pressure of the heat transfer liquid of the cold conduit, and wherein the second local pressure difference device is arranged to determine a first local pressure difference as a pressure difference between a first local pressure of the heat transfer liquid of the hot conduit and a first local pressure of the heat transfer liquid of the cold conduit.

7. The local thermal energy consumer assembly according to claim 6, wherein the hot conduit pressure determining device is connected to the hot conduit adjacent to where the thermal energy generator heat exchanger is connected to the hot conduit, and wherein the cold conduit pressure determining device is connected to the cold conduit adjacent to where the thermal energy generator heat exchanger is connected to the cold conduit.

8. The local thermal energy generator assembly according to claim 5, wherein the temperature difference between the first and second temperatures is in the range of 5-16° C.

9. A thermal energy assembly comprising:
a first local thermal energy consumer assembly according to claim 1; and
a second local thermal energy generator assembly arranged to be connected to the thermal energy circuit comprising the hot conduit and the cold conduit, the second local thermal energy generator comprising
a second thermal energy generator valve:
a second thermal energy generator pump;
a second thermal energy generator heat exchanger connectable to the cold conduit via the thermal energy generator valve for allowing heat transfer liquid from the cold conduit to flow into the second thermal energy generator heat exchanger, connectable to the cold conduit via the second thermal energy generator pump for pumping heat transfer liquid from the cold conduit into the second thermal energy generator heat exchanger, and connectable to the hot conduit for allowing return of heat transfer liquid from the second thermal energy generator heat exchanger to the hot conduit, wherein the second thermal energy generator heat exchanger is arranged to transfer thermal energy from its surroundings to heat transfer liquid, such that the heat transfer liquid returned to the hot conduit has a temperature higher than the second temperature;
a second pressure difference determining device configured to determine a second local pressure difference, $\Delta p2$, between heat transfer liquid of the hot and the cold conduits; and
a second controller arranged to, based on the second local pressure difference, selectively control the use of either the second thermal energy generator valve or the second thermal energy generator pump.

10. The thermal energy assembly according to claim 9, wherein the first pressure difference determining device and the second pressure difference determining device are integrated into a single unit.

11. The thermal energy assembly according to claim 9, wherein the first pressure difference determining device and the second pressure difference determining device are separate devices.

12. The thermal energy assembly according to claim 9, wherein the first controller and the second controller are integrated into a single unit or wherein the first controller and the second controller are separate devices.

13. A method for controlling a thermal energy consumer heat exchanger being, via a thermal energy consumer valve and a thermal energy consumer pump, selectively connected to a hot conduit being configured to allow heat transfer liquid of a first temperature to flow therethrough, and being, via a return conduit, connected to a cold conduit being configured to allow heat transfer liquid of a second temperature to flow therethrough, wherein the second temperature is lower than the first temperature, the method comprising:
determining a first local pressure difference between heat transfer liquid of the hot conduit and heat transfer liquid of the cold conduit; and
based on the first local pressure difference, selectively activating either the thermal energy consumer valve or the thermal energy consumer pump for allowing heat transfer liquid from the hot conduit to enter into the thermal energy consumer heat exchanger,
wherein the thermal energy consumer valve is set to be selectively activated when the first local pressure difference indicates that a first local pressure of the heat transfer liquid of the hot conduit is larger than a first local pressure of the heat transfer liquid of the cold conduit, and wherein the thermal energy consumer pump is set to be selectively activated when the first local pressure difference indicates that the first local pressure of the heat transfer liquid of the hot conduit is lower than or equal to the first local pressure of the heat transfer liquid of the cold conduit.

14. A method for controlling a thermal energy generator heat exchanger being, via a thermal energy generator valve and a thermal energy generator pump, selectively connected to a cold conduit being configured to allow heat transfer liquid of a second temperature to flow therethrough, and, via a return conduit, connected to a hot conduit being configured to allow heat transfer liquid of a first temperature to flow therethrough, wherein the second temperature is lower than the first temperature, the method comprising:
    determining a local pressure difference between heat transfer liquid of the hot conduit and heat transfer liquid of the cold conduit; and
    based on the local pressure difference, selectively controlling the use of either the thermal energy-generator valve or the thermal energy generator pump for allowing heat transfer liquid from the cold conduit to enter into the thermal energy generator heat exchanger,
    wherein the thermal energy generator valve is set to be selectively activated when the local pressure difference indicates that a local pressure of the heat transfer liquid of the cold conduit is larger than a local pressure of the heat transfer liquid of the hot conduit, and wherein the thermal energy generator pump is set to be selectively activated when the second local pressure difference indicates that the second local pressure of the heat transfer liquid of the cold conduit is lower than or equal to the second local pressure of the heat transfer liquid of the hot conduit.

15. The local thermal energy consumer assembly according to claim 1, wherein the thermal energy generator heat exchanger is selectively connectable to the thermal energy consumer valve or the thermal energy consumer pump.

* * * * *